(12) United States Patent
Tzeng et al.

(10) Patent No.: US 8,533,493 B1
(45) Date of Patent: Sep. 10, 2013

(54) METHOD OF SECURING TRANSMISSION DATA

(75) Inventors: Jeng-Nan Tzeng, New Taipei (TW); I-Te Chen, Kaohsiung (TW); Jer-Min Tsai, Kaohsiung (TW)

(73) Assignees: National Chengchi University, Taipei (TW); Kaohsiung Medical University, Kaohsiung (TW); Kun Shan University, Tainan (TW)

( * ) Notice: Subject to any disclaimer, the term of this patent is extended or adjusted under 35 U.S.C. 154(b) by 0 days.

(21) Appl. No.: 13/422,159

(22) Filed: Mar. 16, 2012

(51) Int. Cl.
*H04L 29/06* (2006.01)
(52) U.S. Cl.
USPC .................................. 713/189; 380/44
(58) Field of Classification Search
USPC .................. 726/26, 29; 713/189, 193, 153; 380/278, 44, 45, 46
See application file for complete search history.

(56) References Cited

U.S. PATENT DOCUMENTS 6,731,754 B1 * 5/2004 Ito .................................... 380/28

* cited by examiner

*Primary Examiner* — Edward Zee
(74) *Attorney, Agent, or Firm* — Davidson Berquist Jackson & Gowdey LLP

(57) ABSTRACT

A method is provided for securing transmission data between an upload device and a download device. The upload device is configured to generate a first matrix, a second matrix and a re-encryption vector, to encrypt a plaintext data file using the first matrix to obtain a ciphertext data file, to transmit the ciphertext data file and the re-encryption vector to a server, and to transmit the second matrix to the download device. The server is configured to re-encrypt the ciphertext data file using the re-encryption vector to obtain a re-encrypted data file that can be decrypted using the second matrix to obtain a decrypted data file, and to allow the download device to download the re-encrypted data file therefrom.

9 Claims, 4 Drawing Sheets

US 8,533,493 B1

METHOD OF SECURING TRANSMISSION DATA

BACKGROUND OF THE INVENTION

1. Field of the Invention

The invention relates to a method for securing transmission data, more particularly to a method for securing transmission data using a row complete matrix.

2. Description of the Related Art

Generally, data transmission through the Internet brings about a problem of data security. Therefore, a proper mechanism of data encryption and decryption becomes an important issue.

In cloud computing, a conventional algorithm for cryptography, such as Advanced Encryption Standard (AES), is primarily used to encrypt and decrypt the data during transmission of the data from an upload device to a download device through a cloud server. However, in such transmission system using the conventional algorithm, both of the download device and the cloud server have to store a password from the upload device for downloading the data. Thus, it is inconvenient for a user, and the cloud server may have an additional load in key management.

SUMMARY OF THE INVENTION

Therefore, the object of the present invention is to provide a method for securing transmission data that is relatively efficient.

Accordingly, a method of the present invention for securing transmission data between an upload device and a download device is to be implemented by the upload device and a server, and comprises the following steps of:

a) configuring the upload device to generate a first matrix and a second matrix, and to generate a re-encryption vector based upon a relationship between the first and second matrices;

b) configuring the upload device to encrypt a plaintext data file using the first matrix so as to obtain an ciphertext data file, to transmit the ciphertext data file and the re-encryption vector to the server, and to transmit the second matrix to the download device;

c) configuring the server to re-encrypt the ciphertext data file using the re-encryption vector so as to obtain a re-encrypted data file, which can be decrypted using the second matrix to obtain a decrypted data file corresponding to the plaintext data file; and d) configuring the server to allow the download device to download the re-encrypted data file therefrom;

wherein each of the first and second matrices is a Latin square matrix including a plurality of rows and a plurality of columns, being composed of a particular set of elements each of which occurs once in each of the rows and occurs once in each of the columns, and satisfying a condition that all possible combination of two of the elements in the particular set can be found as adjacent two elements in the rows.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
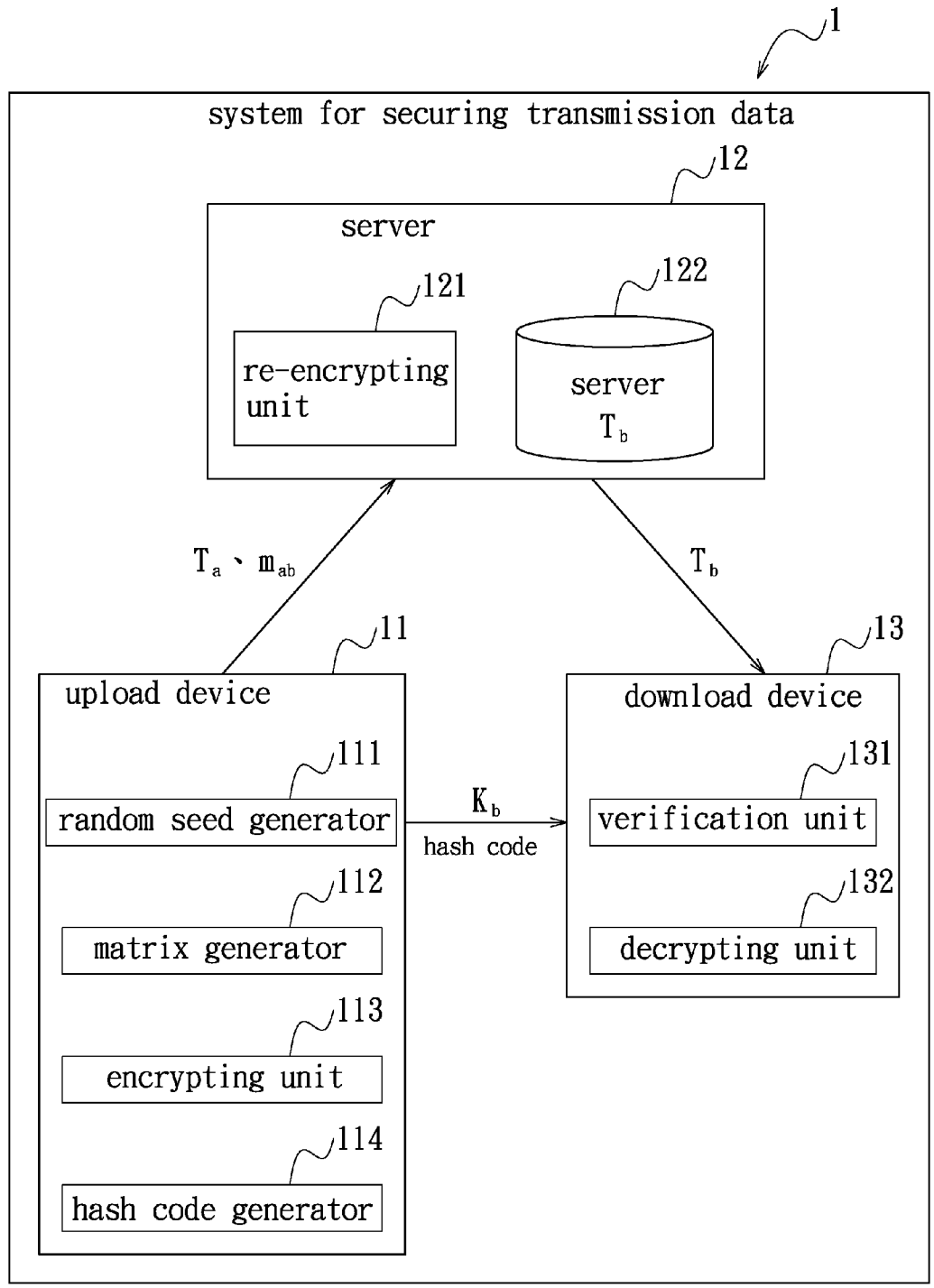
FIG. 1 is a block diagram of a preferred embodiment of a system for securing transmission data according to the invention.
Figure 2:
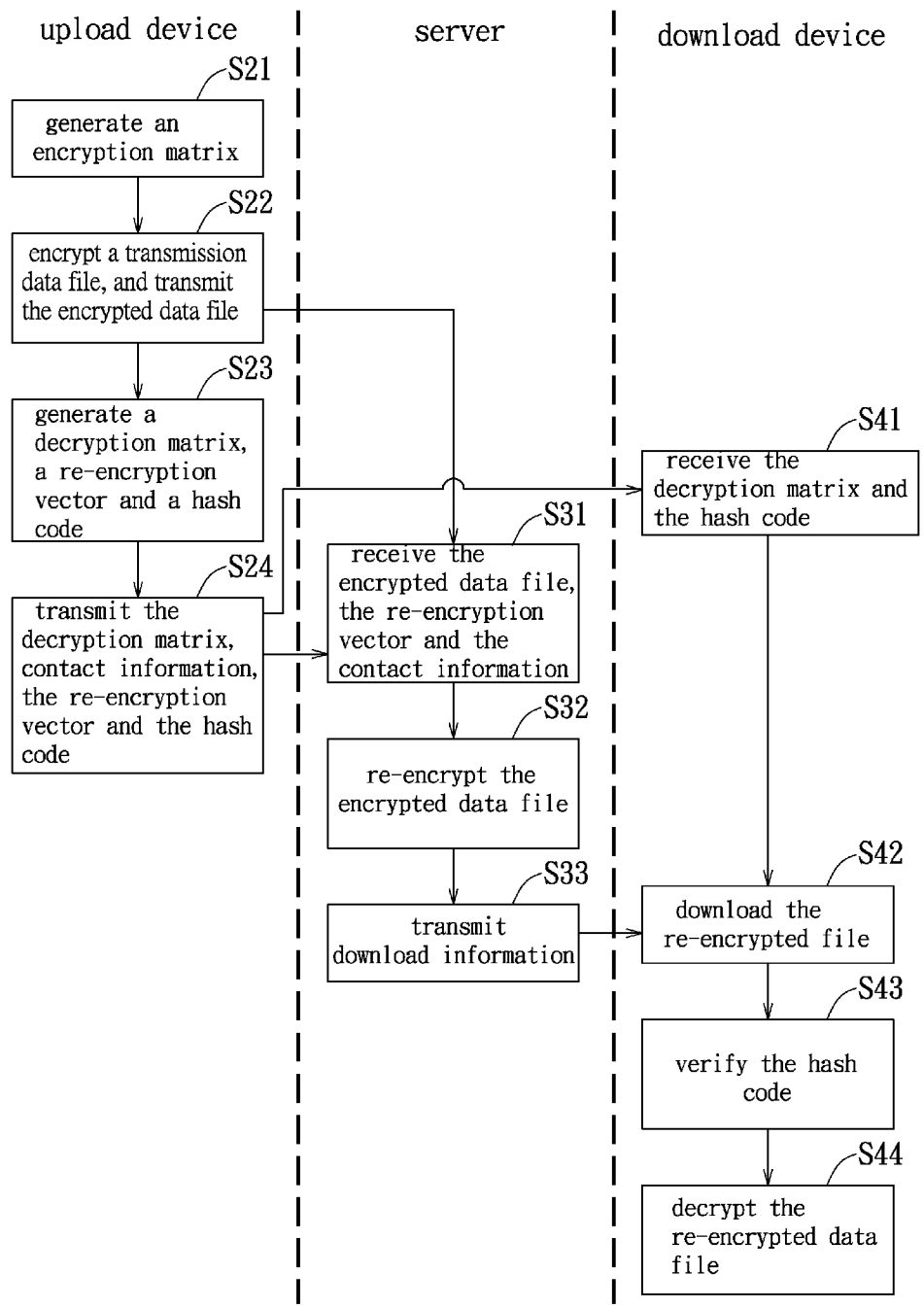
FIG. 2 is a flow chart of a preferred embodiment of a method for securing transmission data according to the invention.

As shown in FIGS. 1 and 2, the preferred embodiment of a method for securing transmission data according to the present invention is to be implemented by a data transmission system 1. The data transmission system 1 includes an upload device 11, a server 12 and a download device 13, each of which is a computer in this embodiment. Each of the upload device 11 and the download device 13 may also be a portable device, such as a smart mobile phone, in other embodiments.

The upload device 11 includes a random seed generator 111, a matrix generator 112, an encrypting unit 113 and a hash code generator 114. In this embodiment, the components of the upload device 11 are implemented as program modules, which when executed cause the upload device 11 to perform functions of the components.

The server 12 includes a re-encrypting unit 121 and a database 122. Similarly, in this embodiment, the re-encrypting unit 121 is implemented as a program module, which is stored in the server 12 and which when executed causes the server 12 to perform functions of the re-encrypting unit 121.

The download device 13 includes a verification unit 131 and a decrypting unit 132. Similarly, the components of the download device 13 are implemented as a program module, which when executed cause the download device 13 to perform functions of the verification unit 131 and the decrypting unit 132.

A practical implementation of the method, which is executed cooperatively by the random seed generator 111, the matrix generator 112, the encrypting unit 113, the hash code generator 114, the re-encrypting unit 121, the database 122, the verification unit 131 and the decrypting unit 132, will be described in detail below.

First, when a user wants to share a plaintext data file using the upload device 11, a password in an alphanumeric form must be inputted. Then, the random seed generator 111 is operable to generate a random seed based on the password. It is worth mentioning that the same password will result in the same random seed. Since the relationship between the password and the random seed is readily appreciated by those skilled in art, details thereof will be omitted herein for the sake of brevity.

In step S21 of the method for securing transmission data, the matrix generator 112 of the upload device 11 is operable to generate a first matrix ($K_a$) that serves as an encryption key.

Figure 3:
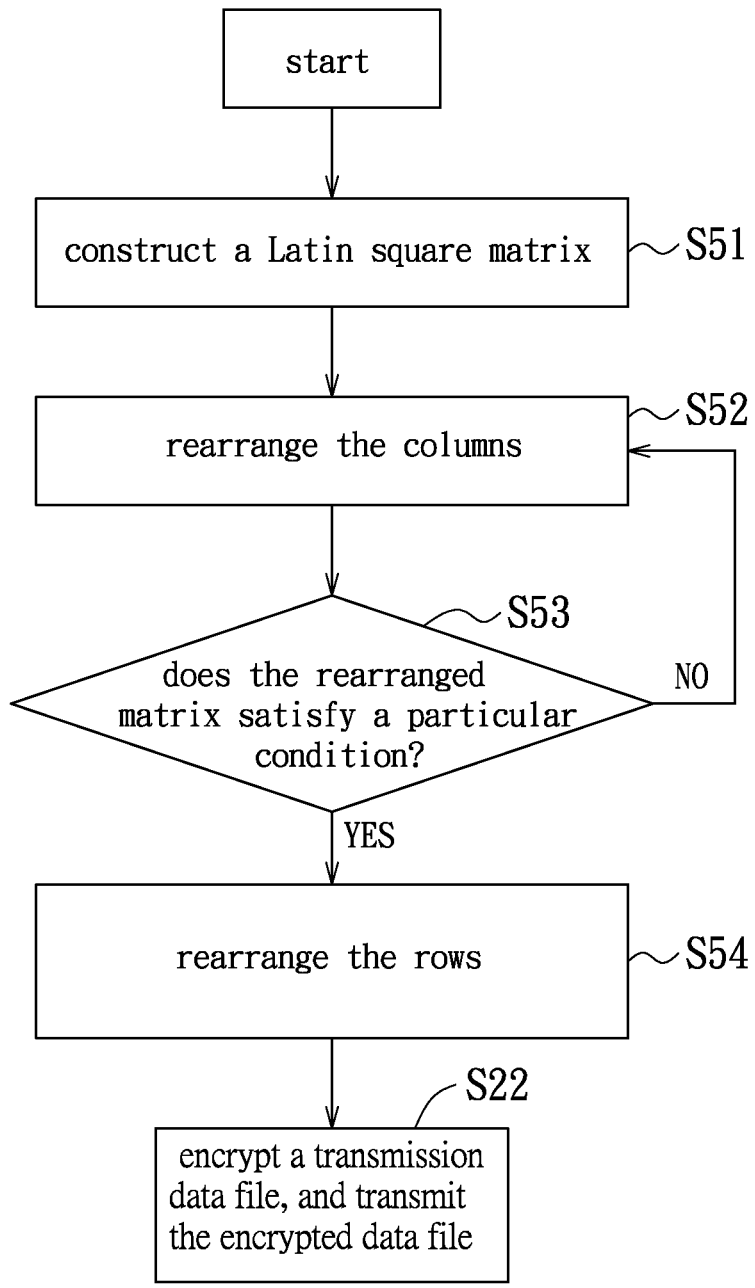
FIG. 3 is a flow chart illustrating sub-steps of the method to generate a first matrix and a second matrix.

Specifically, as shown in FIG. 3, the matrix generator 112 is operable to implement the following sub-steps S51 to S54 of step S21 to generate the first matrix ($K_a$).

In sub-step S51, the matrix generator 112 is operable to construct a random Latin square matrix. Particularly, the Latin square matrix includes a plurality of rows and a plurality of columns (for example, four rows and four columns in this embodiment), and is composed of a particular set of elements (for example, 0, 1, 2, and 3 in this embodiment). Each of the elements in the particular set occurs once in each of the rows of the Latin square matrix, and occurs once in each of the columns of the Latin square matrix. For example, a 4-by-4 Latin square matrix can be expressed as $$\begin{bmatrix} 1 & 2 & 3 & 0 \\ 2 & 3 & 0 & 1 \\ 0 & 1 & 2 & 3 \\ 3 & 0 & 1 & 2 \end{bmatrix}.$$

In sub-step S52, the matrix generator 112 is operable to rearrange the columns of the Latin square matrix. Taking the aforementioned 4-by-4 Latin square matrix as an example, when the first column $$\begin{bmatrix} 1 \\ 2 \\ 0 \\ 3 \end{bmatrix}$$

and the second column $$\begin{bmatrix} 2 \\ 3 \\ 1 \\ 0 \end{bmatrix}$$

are interchanged, a rearranged Latin square matrix is obtained, $$\begin{bmatrix} 2 & 1 & 3 & 0 \\ 3 & 2 & 0 & 1 \\ 1 & 0 & 2 & 3 \\ 0 & 3 & 1 & 2 \end{bmatrix}.$$

In sub-step S53, the matrix generator 112 is operable to determine whether the rearranged Latin square matrix obtained in sub-step S52 is a row complete matrix, i.e., a matrix satisfying a condition that all possible combinations of two of the elements in the particular set can be found as adjacent two elements in the rows of this matrix. Taking the aforementioned rearranged Latin square matrix $$\begin{bmatrix} 2 & 1 & 3 & 0 \\ 3 & 2 & 0 & 1 \\ 1 & 0 & 2 & 3 \\ 0 & 3 & 1 & 2 \end{bmatrix}$$

as an example, adjacent two elements in the first row of the rearranged Latin square matrix [2 1 3 0] include (2, 1), (1, 3) and (3, 0), in the second row [3 2 0 1] include (3, 2), (2, 0) and (0, 1), in the third row [1 0 2 3] include (1, 0), (0, 2) and (2, 3), and in the fourth row [0 3 1 2] include (0, 3), (3, 1) and (1, 2). It can be seen that all possible combinations of two of the elements in the particular set (0, 1, 2, and 3) are found in one of the rows of the rearranged Latin square matrix, and therefore the rearranged Latin square matrix is considered as a row complete matrix.

A n-by-n row complete matrix has the following properties:
1. A matrix obtained by rearranging the rows of the row complete matrix is also a row complete matrix.
2. A matrix obtained by interchanging two elements outside the main diagonal of the row complete matrix is also a row complete matrix.
3. There exists a nonzero vector with (n−1) dimension such that a matrix obtained by modulo addition on each element of the i-th column of the row complete matrix and the i-th element of the vector is also a row complete matrix.

Since the above three properties can be readily derived and appreciated by ones skilled in art, details thereof are omitted for sake of brevity.

Figure 4:
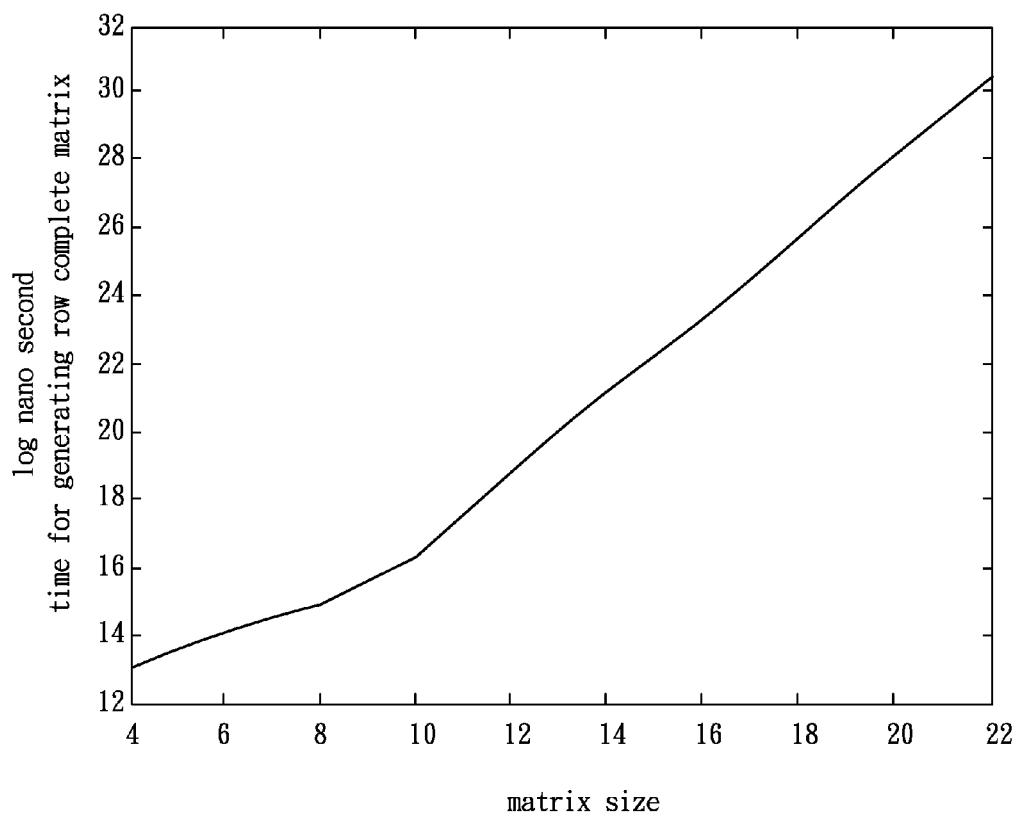
FIG. 4 is a plot showing the time for generating row complete matrices with different sizes.

Based on the above three properties, it can be appreciated that a 2-by-2 Latin square matrix may have two different row complete matrices derived therefrom, a 4-by-4 Latin square matrix may have 144 different row complete matrices derived therefrom, and a 6-by-6 Latin square matrix may have 12441600 different row complete matrices derived therefrom. Thus, when size of the matrix is relatively larger, a relatively greater number of different row complete matrices of that size can be derived therefrom, so that a relatively better security effect can be achieved. FIG. 4 shows the time for generating the row complete matrices with different sizes using the above method.

In FIG. 4, the horizontal axis indicates the size of the row complete matrix, and the vertical axis indicates the time for generating the row complete matrix in natural logarithm of nanoseconds. FIG. 4 suggests that the method of this embodiment for generating the row complete matrices takes logarithmic time without a problem of time complexity.

The flow goes to sub-step S54 when it is determined in sub-step S53 that the rearranged Latin square matrix is a row complete matrix, and goes back to step S52 when otherwise.

In step S54, the matrix generator 112 is operable to randomly rearrange the rows of the rearranged Latin square matrix obtained in sub-step S52 so as to obtain the first matrix ($K_a$). From the above-mentioned Property 1, the first matrix ($K_a$) is also a row complete matrix certainly since the rearranged Latin square matrix is a row complete matrix.

Then, in step S22, the encrypting unit 113 of the upload device 11 is operable to encrypt the plaintext data file using the first matrix ($K_a$) so as to obtain an ciphertext data file ($T_a$), and to transmit the ciphertext data file ($T_a$) to the database 122 of the server 12 via a transmission module (not shown) of the upload device 11. The plaintext data file is composed of a plurality of plaintext elements, which are represented by quaternary numbers in this embodiment. The encrypting unit 113 of the upload device 11 is configured to encrypt the plaintext data file by encoding the plaintext elements using respective pairs of adjacent two of the columns of the first matrix ($K_a$) in a particular order that is indicated by a first one of the columns of the first matrix ($K_a$). It is assumed that the first matrix ($K_a$) is $$\begin{bmatrix} 2 & 1 & 3 & 0 \\ 3 & 2 & 0 & 1 \\ 1 & 0 & 2 & 3 \\ 0 & 3 & 1 & 2 \end{bmatrix},$$

The elements (2,3,1), except 0, indicate the order of encoding. The first element of the plaintext is encoded by the second and the third columns of the first matrix (Ka); in turns, the second element of the plaintext data file is to be encoded using the third and fourth columns of the first matrix ($K_a$), a third one of the plaintext elements of the plaintext data file is to be encoded using the first and second columns of the first matrix ($K_a$), and, in a recursive fashion, a fourth one of the plaintext elements of the plaintext data file is to be encoded using the second and third columns of the first matrix ($K_a$). In this embodiment, the element 0 is ignored.

It is assumed that the first plaintext element of the plaintext data file is 2, and the second and the third columns of the first matrix ($K_a$) are $$\begin{bmatrix} 1 & 3 \\ 2 & 0 \\ 0 & 2 \\ 3 & 1 \end{bmatrix}.$$

In this embodiment, the first one of the two columns (i.e., the second column of the first matrix ($K_a$)) serves as the encoding index, and the second one of the two columns (i.e., the third column of the first matrix ($K_a$)) serves to provide values of encoded elements respectively for the plaintext elements. Accordingly, it is found that the first plaintext element (i.e., 2) is equal to the second element of the second column of the first matrix ($K_a$) in the second row, and thus the first plaintext element is encoded as a first encoded element represented by 0, which is the second element of the third column of the first matrix ($K_a$) adjacent to the second element (i.e., 2) of the second column of the first matrix ($K_a$). Similarly, it is assumed that the second plaintext element is 2, and the third and fourth columns of the first matrix ($K_a$) are $$\begin{bmatrix} 3 & 0 \\ 0 & 1 \\ 2 & 3 \\ 1 & 2 \end{bmatrix},$$

and therefore the second plaintext element is encoded as a second encoded element represented by 3. Further, it is assumed that the third plaintext element is 2, and the first and second columns of the first matrix ($K_a$) are $$\begin{bmatrix} 2 & 1 \\ 3 & 2 \\ 1 & 0 \\ 0 & 3 \end{bmatrix},$$

and therefore the third plaintext element is encoded as a third encoded element represented by 1. It should be noted that the encoded elements collectively make up the ciphertext data file ($T_a$).

In step S23, the matrix generator 112 of the upload device 11 is operable to generate a second matrix ($K_b$) that serves as a decoding key, and a re-encryption vector ($m_{ab}$) based upon a relationship between the first and second matrices ($K_a$) and ($K_b$). The hash code generator 114 of the upload device 11 is operable to generate a hash code based upon the second matrix ($K_b$). The second matrix ($K_b$) is required to have the same size as the first matrix ($K_a$), and the procedure for generating the second matrix ($K_b$) is similar to that for generating the first matrix ($K_a$). In this embodiment, the second matrix ($K_b$) is assumed to be expressed as $$\begin{bmatrix} 1 & 0 & 2 & 3 \\ 2 & 1 & 3 & 0 \\ 3 & 2 & 0 & 1 \\ 0 & 3 & 1 & 2 \end{bmatrix}.$$

The re-encryption vector ($m_{ab}$) is used to re-encrypt the ciphertext data file ($T_a$) so as to obtain a re-encrypted data file ($T_b$), which can be decrypted using the second matrix ($m_{ab}$) to obtain a decrypted data file corresponding to the plaintext data file. In particular, the re-encrypted data file ($T_b$) is composed of a plurality of re-encoded elements that correspond respectively to the plaintext elements and that can be decoded in a particular order indicated by a first one of the columns of the second matrix ($K_b$).

The first column of the second matrix ($K_b$) is $$\begin{bmatrix} 1 \\ 2 \\ 3 \\ 0 \end{bmatrix}.$$

The elements (2,3,1), except 0, indicate the order of encoding. The first two elements of the first column of the second matrix (1, 2) indicate that a first one of the re-encoded elements of the re-encoded data file ($T_b$) is to be decoded using the first and second columns of the second matrix ($K_b$). In the particular order, a second one of the re-encoded elements is to be encoded using the second and third columns of the second matrix ($K_b$), a third one of the re-encoded elements is to be encoded using the third and fourth columns of the second matrix ($K_b$), and, in a recursive fashion, a fourth one of the re-encoded elements is to be encoded using the first and second columns of the second matrix ($K_b$). In this embodiment, the element 0 is ignored.

The re-encoded elements of the re-encoded data file ($T_b$) are represented by quaternary numbers. It is assumed that the first re-encoded element is 2, and the first and second columns of the second matrix ($K_b$) are $$\begin{bmatrix} 1 & 0 \\ 2 & 1 \\ 3 & 2 \\ 0 & 3 \end{bmatrix}.$$

Contrary to the encoding procedure, the first one of these two columns serves to provide values of decoded elements of the decrypted data file respectively from the re-encoded elements of the re-encrypted data file ($T_b$), and the second one of these two columns serves as the decoding index. Therefore, the first re-encoded element (i.e., 2) is decoded into the first decoded element represented by 3. It is assumed that the second re-encoded element is 2, and the second and the third columns of the second matrix ($K_b$) are $$\begin{bmatrix} 0 & 2 \\ 1 & 3 \\ 2 & 0 \\ 3 & 1 \end{bmatrix},$$

and therefore the second decoded element is represented by 0. Similarly, it is assumed that the third encoded element is 2, and the third and fourth columns of the second matrix ($K_b$) are $$\begin{matrix} 2 & 3 \\ 3 & 0 \end{matrix}$$

-continued $$\begin{bmatrix} 0 & 1 \\ 1 & 2 \end{bmatrix},$$

and therefore the third decoded element is represented by 1.

The re-encryption vector ($m_{ab}$) is used to re-encrypt the ciphertext data file so as to ensure that the decrypted data file is identical to the plaintext data file, where the decoded elements corresponding respectively to the re-encoded elements collectively make up the decrypted data file. For example, the first plaintext element of the plaintext data file is 2, and from the decoding procedure, the first re-encoded element should be 1 so that the first re-encoded element can be decoded as 2 that is identical to the first plaintext element. Also from the encoding procedure, the first encoded element of the ciphertext data file ($T_a$), denoted by $T_a(1)$, from the first plaintext element is 0. Thus the difference between 0 and 1 is eliminated by re-encoding the first encoded element using a first re-encryption element of the re-encryption vector. In this embodiment, each of the encoded elements of the ciphertext data file ($T_a$) is re-encoded by modulo addition on the encoded element and a corresponding one of the re-encryption elements of the re-encryption vector ($m_{ab}$). In particular, each of the encoded elements is re-encoded as a reminder of a sum of the encoded element and a corresponding one of the re-encryption elements of the re-encryption vector ($m_{ab}$) divided by a number of the rows (four in this embodiment) of the first matrix ($K_a$). It can be easily appreciated that the first re-encryption element of the re-encryption vector, denoted by $m_{ab}(1)$, should be 1.

Specifically, the first re-encoded element of re-encrypted data file ($T_b$), denoted by $T_b(1)$, is given by modulo addition, mod ($T_a(1)+m_{ab}(1),4$), where $T_a(1)$ is 0, $m_{ab}(1)$ is 1, and, as desired, $T_b(1)$ is 1 in this example.

Similarly, the second plaintext element of the plaintext data file is 2, the second re-encoded element is 0, and the second encoded element of the ciphertext data file $T_a(2)$ is 3. In order to make the reminder of a sum of 3 and the second re-encryption element of the re-encryption vector $m_{ab}(2)$ divided by 4 be the second re-encoded element (i.e., 0), the second re-encryption element $m_{ab}(2)$ must be 1. Specifically, the second re-encoded element of the re-encrypted data file $T_b(2)$ is given by mod($T_a(2)+m_{ab}(2)$, 4), where $T_a(2)$ is 3, $m_{ab}(2)$ is 1, and, as desired, $T_b(2)$ is 0 in this example.

The third plaintext element of the plaintext data file is 2, the third re-encoded element is 3, and the third encoded element of the ciphertext data file $T_a(3)$ is 1. In order to make the reminder of a sum of 1 and the third re-encryption element of the re-encryption vector $m_{ab}(3)$ divided by 4 be the third re-encoded element (i.e., 3), the third re-encryption element $m_{ab}(3)$ must be 2. Specifically, the third re-encoded element of the re-encrypted data file $T_b(3)$ is given by mod($T_a(3)+m_{ab}(3),4$), where $T_a(3)$ is 1, $m_{ab}(3)$ is 2, and, as desired, $T_b(3)$ is 3 in this example. From the above procedure, the re-encryption vector ($m_{ab}$) is given as [1, 1, 2].

In practice, for relatively greater security, the first and second matrices ($K_a$) and ($K_b$) may have a relatively larger size, consequently resulting in a relatively larger re-encryption vector ($m_{ab}$). However, since the re-encoding procedure only involves modulo addition, time complexity of the re-encoding procedure implemented by the server 12 for re-encrypting the ciphertext data file ($T_a$) still takes constant time, so that the system 1 does not have a substantial computational workload while achieving better security effect.

The hash code in this embodiment is used for managing the second matrix ($K_b$). Since the generation of the hash code and the relationship between the second matrix ($K_b$) and the hash code are readily appreciated by those skilled in the art, details thereof are omitted herein for the sake of brevity.

In step S24, the upload device 11 is operable to transmit the re-encryption vector ($m_{ab}$) and contact information that is related to the download device 13 to the server 12, and to transmit the second matrix ($K_b$) to the download device 13. In this embodiment, the contact information includes an e-mail address.

In step S31, the server 12 is operable to receive the ciphertext data file ($T_a$), the re-encryption vector ($m_{ab}$), and the contact information from the upload device 11.

In step S32, the re-encrypting unit 121 of the server 12 is operable to re-encrypt the ciphertext data file ($T_a$) according to the above-mentioned re-encoding procedure with the re-encryption vector ($m_{ab}$) so as to obtain the re-encrypted data file ($T_b$).

In step S33, the server 12 is configured to transmit download information associated with the re-encrypted data file ($T_b$) to the download device 13 through the contact information, and the download device 13 can download the re-encrypted data file ($T_b$) through the download information. In this embodiment, the download information is an Internet address link. By transmitting the Internet address link, the server 12 allows the download device 13 to download the re-encrypted data file therefrom through the Internet address link.

In step S41, the download device 13 is operable to receive the second matrix ($K_b$) and the hash code from the upload device 11. It is worth noting that the second matrix ($K_b$) is managed by the download device 13 rather than the server 12, such that the server 12 will not have an additional load even with a large number of files to be transmitted.

In step S42, the download device 13 is operable to download the re-encrypted data file ($T_b$) from the database 122 of the server 12 according to the download information.

In step S43, the verification unit 131 of the download device 13 is operable to determine whether the hash code received in the previous step S41 is associated with the second matrix ($K_b$). Since verification of the hash code is well known to those skilled in the art, details thereof are omitted herein for the sake of brevity.

When it is determined that the hash code is associated with the second matrix ($K_b$), the download device 13 is operable, in step S44, to decrypt the re-encrypted data file ($T_b$) received in step S42 using the above-mentioned decoding procedure with the second matrix ($K_b$), so as to obtain the decrypted data file corresponding to the plaintext data file.

To sum up, the method of the present invention involves simple operation, which only uses modulo addition in the re-encoding procedure, such that time complexity of the re-encoding procedure still takes constant time. In addition, since that the second matrix ($K_b$) is managed by the download device 13 rather than the server 12, and that the password is not required to be stored in the server 12, the server 12 will not have an additional load. Moreover, the upload device 11, the server 12 and the download device 13 exclusively have the first matrix ($K_a$), the second matrix ($K_b$) and the re-encryption vector ($m_{ab}$), respectively. This configuration can enhance the security effect, as neither the server 12 nor the download device 13 may obtain the first matrix ($K_a$) by calculating.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for securing transmission data from an upload device to a download device through a server, said method to be implemented by the upload device, and comprising the following steps of:

A) configuring the upload device to generate a first matrix serving as an encryption key and a second matrix serving as a decryption key, and to generate a re-encryption vector based upon the relationship between the first and second matrices;

B) configuring the upload device to encrypt a plaintext data file using the first matrix so as to obtain an ciphertext data file, and to transmit the ciphertext data file and the re-encryption vector to the server, so as to allow the server to re-encrypt the ciphertext data file using the re-encryption vector to obtain a re-encrypted data file, which can be decrypted using the second matrix to obtain a decrypted data file corresponding to the plaintext data file; and C) configuring the upload device to transmit the second matrix to the download device, so as to allow the download device to decrypt the re-encrypted data file using the second matrix upon downloading the re-encrypted data file from the server;

wherein each of the first and second matrices is a Latin square matrix including a plurality of rows and a plurality of columns, being composed of a particular set of elements;

wherein each of the elements in the particular set occurs once in each of the rows and occurs once in each of the columns, and wherein the following condition is satisfied: that all possible combinations of two elements in the particular set can be found as adjacent two elements in the rows.

2. The method as claimed in claim 1, wherein, in step a), the upload device is configured to construct a random Latin square matrix including a plurality of rows and a plurality of columns and being composed of the particular set of elements, each of the elements in the particular set occurring once in each of the rows and occurring once in each of the columns, and to rearrange the columns such that all possible combinations of two elements in the particular set can be found as adjacent two elements in the rows to thereby generate each of the first matrix and the second matrix.

3. The method as claimed in claim 1, the plaintext data file being composed of a plurality of plaintext elements, the re-encrypted data file being composed of a plurality of re-encoded elements corresponding respectively to the plurality of plaintext elements, wherein in step b), the upload device is configured to encrypt the plaintext data file by encoding the plurality of plaintext elements using a pair of adjacent two of the columns of the first matrix so as to obtain respective encoded elements, which collectively make up the ciphertext data file, and each of which corresponds to one of the elements in one of the adjacent two of the columns that is adjacent to one of the elements in another one of the adjacent two of the columns that corresponds to the plaintext element; and the re-encrypted data file obtained in step c) can be decrypted by decoding the plurality of re-encoded elements using a pair of adjacent two of the columns of the second matrix so as to obtain respective decoded elements, which collectively make up the decrypted data file, and each of which corresponds to one of the elements in one of the adjacent two of the columns that is adjacent to one of the elements in another one of the adjacent two of the columns that corresponds to the re-encoded element.

4. The method as claimed in claim 3, wherein:

in step b), the upload device is configured to encrypt the plaintext data file by encoding the plurality of plaintext elements using respective pairs of adjacent two of the columns of the first matrix in a particular order that is indicated by a first one of the columns of the first matrix, so as to obtain the respective encoded elements of the ciphertext data file; and the re-encrypted data file obtained in step c) can be decrypted by decoding the plurality of re-encoded elements using respective pairs of adjacent two of the columns of the second matrix in a particular order that is indicated by a first one of the columns of the second matrix, so as obtain the respective decoded elements of the decrypted data file.

5. The method as claimed in claim 1, wherein the upload device is configured to further generate a hash code based upon the second matrix in step a), and to further transmit the hash code to the download device in step b).

6. The method as claimed in claim 5, further comprising the following steps, to be implemented by the download device, of:

i) configuring the download device to download the re-encrypted data file from the server after step d);

ii) configuring the download device to receive the second matrix and the hash code;

iii) configuring the download device to determine whether the hash code received in step ii) is associated with the second matrix; and iv) when the determination made in step iii) is affirmative, configuring the download device to decrypt the re-encrypted data file received in step i) so as to obtain the decrypted data file.

7. The method as claimed in claim 1, the ciphertext data file being composed of a plurality of encoded elements, the re-encryption vector being composed of a plurality of re-encryption elements, wherein the server is configured to re-encrypt the ciphertext data file by re-encoding each of the plurality of encoded elements as a reminder of a sum of the encoded element and a corresponding one of the plurality of re-encryption elements of the re-encryption vector divided by a number of the rows of the first matrix.

8. The method as claimed in claim 1, wherein:

in step B), the upload device is configured to further transmit contact information related to the download device to the server; and the server is configured to allow the download device to download the re-encrypted data file therefrom by providing the download device through the contact information with download information, according to which the download device can download the re-encrypted data file.

9. The method as claimed in claim 8, wherein the contact information includes an e-mail address.

* * * * *